United States Patent [19]

Kline et al.

[11] Patent Number: 5,533,690
[45] Date of Patent: Jul. 9, 1996

[54] STRAND ALIGNMENT DEVICES FOR HIGH SPEED WINDING OF MAGNETIC TAPE

[75] Inventors: Robert J. Kline, Stillwater; Thomas E. Larsen, St. Paul; Mark A. Schiesl, Hutchinson; Bruce E. Tait, Woodbury, all of Minn.

[73] Assignee: Minnesota Mining and Manufacturing Company, St. Paul, Minn.

[21] Appl. No.: 252,837

[22] Filed: Jun. 2, 1994

[51] Int. Cl.[6] .................................................. B65H 18/26
[52] U.S. Cl. ..................... 242/547; 242/548.2; 242/548.3
[58] Field of Search ................................. 242/547, 548.3, 242/548, 548.2, 346.2

[56] References Cited

U.S. PATENT DOCUMENTS

| | | | |
|---|---|---|---|
| 1,208,419 | 12/1916 | Walser et al. | 242/566 X |
| 2,747,807 | 5/1956 | Hummel | 242/423.2 |
| 2,757,880 | 8/1956 | La Motte | 242/566 X |
| 2,833,489 | 5/1958 | Hall | 242/566 X |
| 3,309,037 | 3/1967 | Amos | 242/548 X |
| 3,572,603 | 3/1971 | Whiteman | 242/547 |
| 3,698,655 | 10/1972 | Chang | 242/547 |
| 4,778,119 | 10/1988 | Yamazaki et al. | |
| 4,789,110 | 12/1988 | Sakaguchi et al. | |
| 4,842,210 | 6/1989 | Kubota et al. | |
| 4,854,517 | 8/1989 | Watanabe et al. | 242/547 X |
| 4,909,455 | 3/1990 | Sakaguchi et al. | |
| 5,039,023 | 8/1991 | Hagens et al. | |
| 5,087,318 | 2/1992 | Anderson | 242/548.3 X |

FOREIGN PATENT DOCUMENTS

| | | | |
|---|---|---|---|
| 2137028 | 1/1972 | Germany . | |
| 3127340 | 4/1982 | Germany . | |
| 3905460 | 8/1989 | Germany . | |
| 5111341 | 8/1980 | Japan | 242/547 |
| 6033335 | 4/1981 | Japan | 242/547 |
| 57-57152 | 4/1982 | Japan . | |
| 4164758 | 6/1992 | Japan | 242/547 |
| 1396647 | 6/1975 | United Kingdom | 242/547 |

*Primary Examiner*—Daniel P. Stodola
*Assistant Examiner*—William A. Rivera
*Attorney, Agent, or Firm*—Gary L. Griswold; Walter N. Kirn; Charles D. Levine

[57] ABSTRACT

Magnetic tape is wound onto a roll at high speeds. Each strand of tape wound onto the roll is precisely superimposed over the previously wound strand by alignment devices including a pre-wrap alignment roller, a packwheel, and a post-winding final alignment guide roller. The final alignment guide roller locates the edges of the strand being wound in positions which are coplanar with the edges of the previously wound strands on the outside of the roll. The tape is aligned and locked in place on the roll by a combination of air removal and alignment and re-alignment steps during air removal.

17 Claims, 5 Drawing Sheets

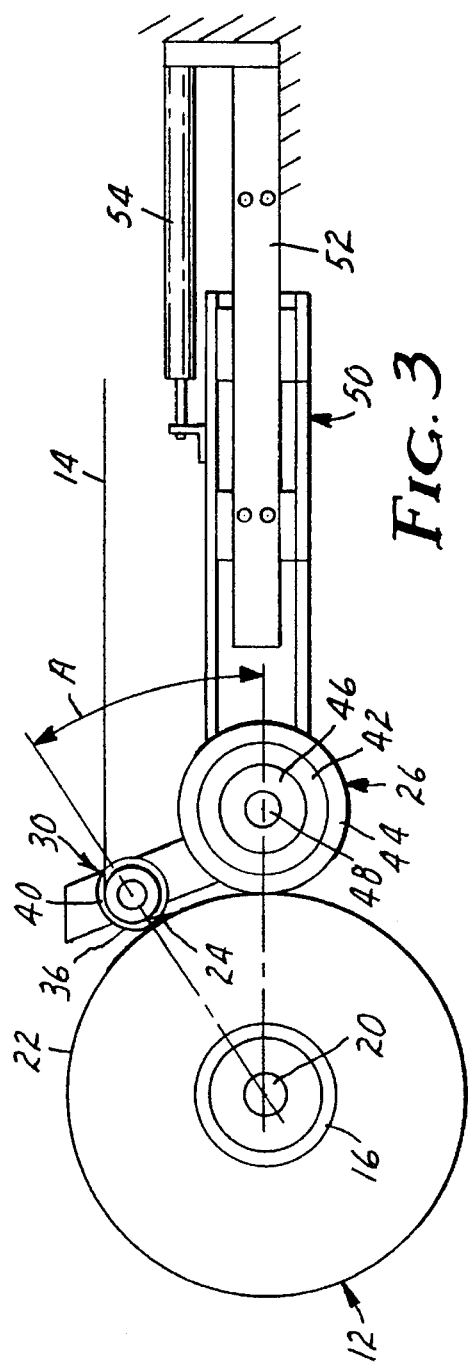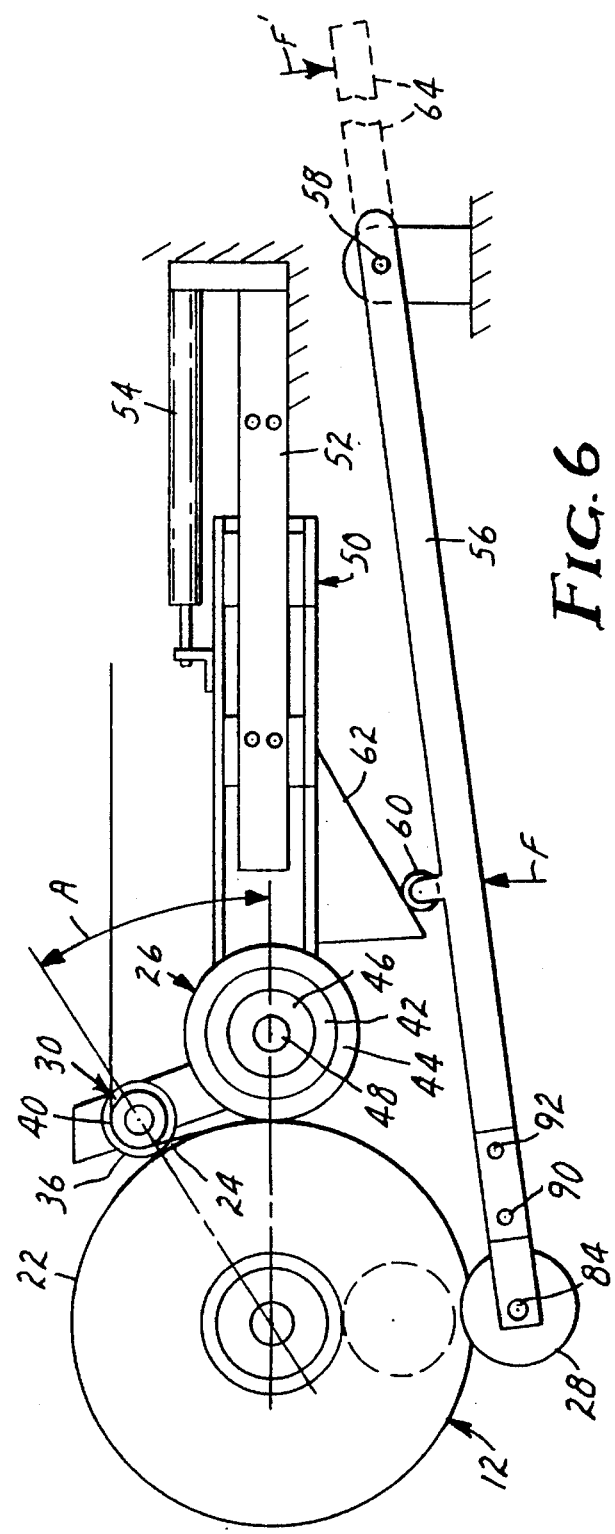

STRAND ALIGNMENT DEVICES FOR HIGH SPEED WINDING OF MAGNETIC TAPE

TECHNICAL FIELD

The present invention involves high speed winding of magnetic recording tape onto flangeless reels. More particularly, the present invention involves the improvement of strand alignment and roll quality during high speed winding of magnetic tape.

BACKGROUND OF THE INVENTION

The need for precise alignment of magnetic tape as it is wound onto a roll is well known. U.S. Pat. No. 4,909,455 describes the need for winding magnetic tape in such a way that each succeeding wrap, or strand, of tape is wound onto the roll of tape in a position which is laterally precisely superimposed over the tape already wound onto the roll. Lateral movement or placement of the tape is across the width of the tape, in a direction substantially parallel to the winding axis. The process of assuring precise superposition of succeeding strands of tape on the roll is called strand alignment. Failure to achieve adequate strand alignment can result in an unsightly appearance of the sides of the roll, as well as damage to the edges of the tape on the roll.

The problem of achieving precise strand alignment becomes acute when winding large rolls, called pancakes, of magnetic recording tape, because the tape wound onto such rolls is typically 0.5 in wide and of such length as to produce a pancake having an outside diameter of 35–41 cm (14–16 in), when wound on a hub having a diameter of only about 11.4 cm (4.5 in). Since the reels used for holding such pancakes consist merely of a hub, with no side flanges which might improve strand alignment and shield the sides of the roll from view, it is important that something aligns the tape strands during winding.

Strand alignment becomes more difficult as winding speeds increase, due to the tendency of the rapidly moving strand and roll surfaces to drag boundary layers of air into the space between the strand being wound and the existing roll of tape. At very high winding speeds, one or more of the outer strands of tape on the roll can float on a cushion of air entrained between the strands. Even the slightest variation in tape properties or mechanical disturbance to the floating strands can lead to noticeable misalignment of the strands on the roll. Despite the difficulties created by attempting to wind magnetic tape at very high speeds, the need for increased productivity in tape manufacturing demands increasing speeds in all phases of the manufacturing process, including winding.

Several systems for improving strand alignment during high speed winding are known. One system blocks the boundary layers of air on the tape strand and on the roll. U.S. Pat. No. 5,039,023 discloses a device which uses small rollers in contact with the roll and the strand for blocking the boundary layer of moving air. This device appears to be useful in reducing the air cushion formed between strands of tape, but still requires additional elements to achieve the actual alignment of the strands. Also, this device is mechanically complex.

Another system for improving strand alignment provides a reference plane, or flange, coincident with one side of the roll, and urges the strands of tape against this flange during winding, providing positive strand alignment. U.S. Pat. No. 4,789,110 discloses a winding apparatus in which the strand of magnetic tape is subjected to a magnetic field which pulls it toward an alignment flange. To facilitate movement of the tape by the relatively weak magnetic forces, air is blown into the interface region to enhance the lubricating effect of the air cushion between the strands. Air is then removed by providing a vacuum at another location on the roll, which fixes the strands in place. This patent also discloses mechanical belts for urging strands of tape toward the reference flange. U.S. Pat. No. 4,842,210 discloses a pressure disk, which acts in cooperation with a magnet, to press the strands of tape against a reference flange.

Although flanges can achieve strand alignment in magnetic tape winding, they present certain difficulties. In particular, tape reels with flanges are heavier and more expensive than flangeless hubs. Further, because the flanges have a large diameter, while being very thin, they are easily broken. Also, in slitting operations, several rolls of tape are wound close to each other, and space may not be available to accommodate flanged reels.

Another known system for improving strand alignment attaches the strand of tape to the roll immediately upon contact of the strand with the roll. In its simplest form, immediate attachment involves contacting the roll with a pressure roll, or packwheel, at the point of contact of the strand and the roll, to press the strand against the roll. However, using packwheels in high speed winding requires prohibitively high contact pressures to remove the boundary layers of air which are dragged along with the tape and roll when the winding speed is high.

An alternative for achieving immediate strand attachment is disclosed in U.S. Pat. No. 4,909,455, in which the tape is magnetized so that the strand being wound is attracted to the roll and is fixed in place as it is wound. Similarly, the strand can be attached to the roll electrostatically. Japanese Kokai 57-57152 discloses the application of an electrical charge onto an electrically insulating magnetic tape before winding onto a roll. Similarly, 3M's U.S. patent application Ser. No. 07/928,153 discloses an apparatus for improving the winding of tape which is not electrically insulating, but contains antistatic agents; applying electrical charges in combination with winding at a sufficiently high speed fixes the strand to the roll before the electrostatic charge has time to dissipate.

These immediate attachment systems are useful in improving strand alignment, but they only remedy that portion of strand misalignment caused by air entrainment, and provide no positive positioning of the strand as it is wound onto the roll. In addition, these immediate attachment systems involve apparatus which may be difficult to install and use in production, and which may be unfamiliar to production workers.

Still another system for improving strand alignment uses edge control rollers, as disclosed in U.S. Pat. No. 4,778,119. As shown in FIG. 1 of this patent, edge control rollers hold the strand of tape in alignment with the roll. As shown in FIG. 2 of this patent, the edge control rollers include tapered flange surfaces, which align the edges of tape with respect to the roll of tape, and which continuously hold and adjust the strands of tape on the roll. This strand alignment system is purely mechanical, and is familiar to production workers. In addition, it provides positive positioning of the strand on the roll, while holding strands in place until the air cushion can flow out of the space between them.

SUMMARY OF THE INVENTION

This invention provides for high speed winding of tape onto a roll. Each strand of tape wound onto the roll is precisely superimposed over the previously wound strand. The tape is aligned and locked in place on the roll by a combination of air removal and a sequence of alignment and re-alignment steps during air removal. The apparatus includes a hub which is rotated and on which the tape is wound. The strands of tape are laterally aligned as the strands are wound onto the hub and air is removed from between strands of tape as they are wound onto previous strands on the hub.

Lateral alignment is performed with a pre-wrap guide roller which can include a central portion and two end flanges. The central portion includes two cylindrical sections located between the end flanges. One cylindrical section has a smaller diameter than the other cylindrical section. The tape wraps around the pre-wrap guide roller to steer the tape toward the flange adjacent the larger cylindrical section to provide a precise locating reference surface for the tape strand.

Lateral alignment is also performed by a final alignment guide roller which moves laterally with the pancake to compensate for any wobble of the pancake during winding without damaging the magnetic tape. The final alignment guide roller can move radially away from the hub as the magnetic tape is wound on the hub to maintain a constant level of force on the outermost strand of the tape on the hub while accommodating an increasing pancake diameter.

The final alignment guide roller can have a pair of flanges coaxially attached to a central hub. The axial length of the hub is greater than the width of the tape strand such that the actual measured surface roughness is less than the potential lateral movement distance created by the clearance between the flanges. The final alignment guide roller flanges can have tapered lead-in portions. Alternatively, post-aligning final alignment can be performed by a pair of spaced flexible disks or freely rotating rollers.

The air removing device can include a packwheel formed as a freely turning solid wheel with a resilient outer layer. The wheel can be mounted on a shaft at a location such that the entering tape strand contacts the outer tape strand 5°–20° ahead of the point of contact between the packwheel and the outer tape strand. The packwheel can be mounted on an arm to maintain the axis of rotation of the packwheel parallel to the axis of rotation of the roll.

The present invention also includes a method of winding a length of magnetic tape in concentric strands on a flangeless hub to form a pancake. The tape strands are laterally aligned as the strands are wound onto the hub by contacting the tape on the roll. Air is removed from between strands of tape as they are wound onto previous strands on the hub by pressing the outer strand on the roll against the roll. The outer strand is supported on a thin lubricating layer of air between it and the previously wound strand on the roll while using the previously wound strands as a gauge to align the outer strand in a position determined by the previously wound strands. The supporting step is repeated for each new outer strand of tape while also performing the supporting step for at least the penultimate and antepenultimate strands of tape, and for additional adjacent strands until the lubricating layer between inner strands becomes sufficiently thin to allow the tape strands to contact each other and lock in place, aligned on the roll.

BRIEF DESCRIPTION OF THE DRAWINGS

FIG. 3 is a side view of the apparatus of FIG. 1 with the packarm applying packing force to the roll during winding.

FIG. 6 is a side view of an alternative embodiment for positioning a final alignment guide roller using pivoting arm and cam.

DETAILED DESCRIPTION

The winding system of the present invention includes several components, each of which can independently improve the wind quality of a pancake of magnetic tape on a hub. Each strand of tape is precisely laterally positioned on the preceding strand in the roll which forms the pancake. The winding system removes air from between strands of tape as they are wound onto the roll, while laterally aligning the strands. This permits operation at winding speeds above 610 m/minute (2000 ft/minute). Together the components of this system create a pancake having very smooth sides, with a surface roughness as low as 20–30 microinches ($R_A$). (Surface roughness is the average deviation of surface height from the mean height, as measured by a Taylor Hobson Surtronic 3 profilometer.) Sides of pancakes wound without using this invention exhibit surface roughnesses in the range of several hundred micro-inches, while sides of sample pancakes from a competitor have been found to exhibit surface roughnesses of about 80 micro-inches.

Sides of pancakes having a surface roughness in the hundreds of micro-inches appear rough, both visually and tactilely, while sides of pancakes having roughnesses below 100 micro-inches appear smooth. Sides of pancakes having roughnesses in the 20–30 micro-inch range appear almost glass-like in their smoothness. This creates a visually aesthetic wind and can be used with wound rolls of any type of web on a hub.

Figure 1:
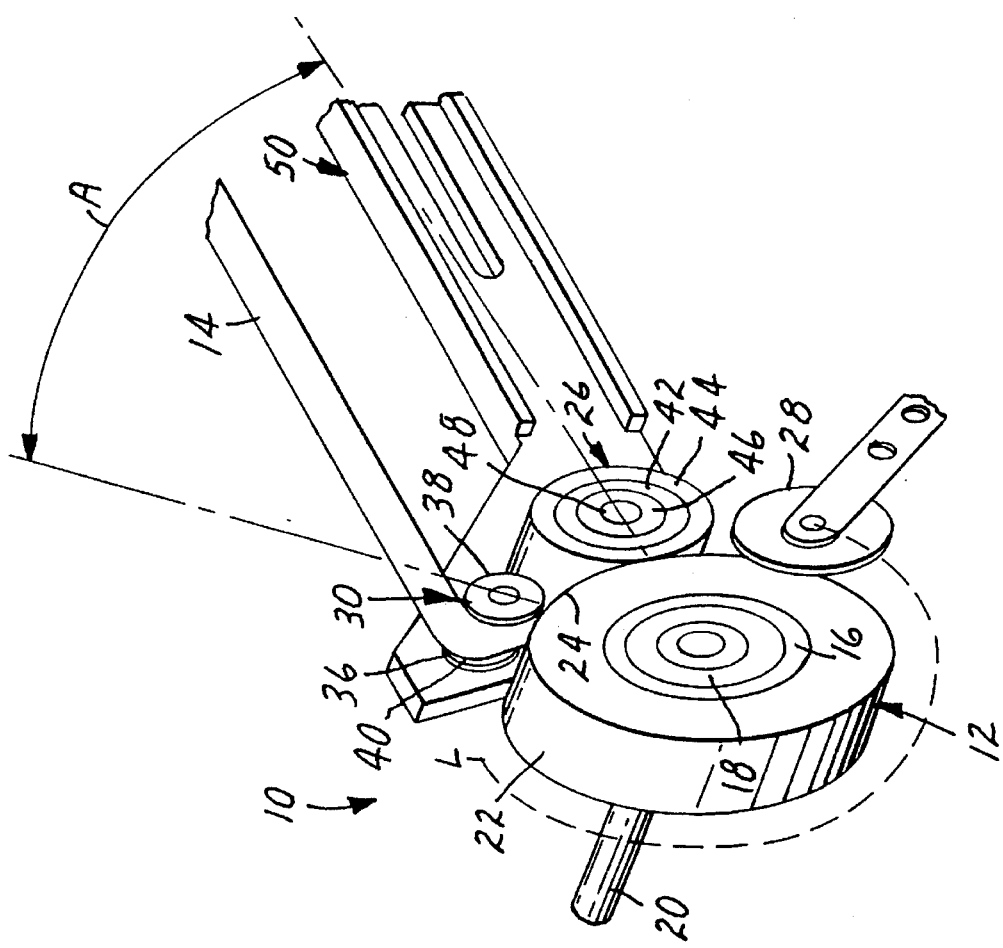
FIG. 1 is a perspective view of the winding apparatus of the present invention.

Referring to FIG. 1, this apparatus 10 helps form a pancake or roll 12 of tape by guiding and winding the entering strand of tape 14 onto a rotatable hub 16. The hub 16 is carried on rotating chuck 18, which is mounted on a rotating shaft 20. One suitable chuck 18 is the air-actuated clutch described in 3M's U.S. patent application Ser. No. 08/016,503, which has both radial and axial alignment detents for positioning the pancake hub relative to the chuck. The chuck can have a drive detent for rotationally locking the hub to the chuck. The chuck precisely seats the hub in mating engagement with the alignment detents by imparting various motions to the hub relative to the chuck during alignment. The clutch aligns the hub and holds it firmly in place during winding to reduce the amount of strand correction required of the alignment devices.

Because the surface speed of the entering tape strand 14 and the outer strand 22 on the roll 12 can exceed 610 m/minute (2000 ft/minute), there is a tendency for the surfaces of these strands to drag boundary layers of air into the region 24, between the entering strand 14 and the outer strand 22, causing the outer strand to float on the inner strand. A portion of this boundary layer is squeezed out by a packwheel 26, which presses the entering strand 14 against previously wound outer strand 22. Because, at the winding speeds encountered in production, the packwheel 26 does not completely remove the layer of entrained air between the strands, the strand 22 can float on the air layer between it and the next inward strand on the roll 12. This allows the strand 22 to move transversely, in a direction parallel to the axis of rotation of the roll 12 and the shaft 20.

Floating strands caused by this lubricating air layer can cause succeeding strands of tape to fail to remain precisely superimposed upon previously wound strands. This condition is commonly known as strand misalignment or scatter-wind and is usually caused by vibration or tension upsets. The inventors discovered that the air layer need not lead to strand misalignment. This air layer can be used to enable succeeding strands wound onto the roll 12 to be more, rather than less, precisely aligned relative to previously wound strands.

This alignment is accomplished by a post-wrap or final alignment guide such as a flanged guide roller 28, in addition to a pre-alignment device such as a pre-wrap guide roller 30, and an air removal device such as the packwheel 26. The angular position of the final alignment guide around the periphery of the roll 12 is not critical. It can be placed in any location in the region located clockwise from the packwheel 26 and a point L, just before the pre-wrap roller 30.

Figure 2:
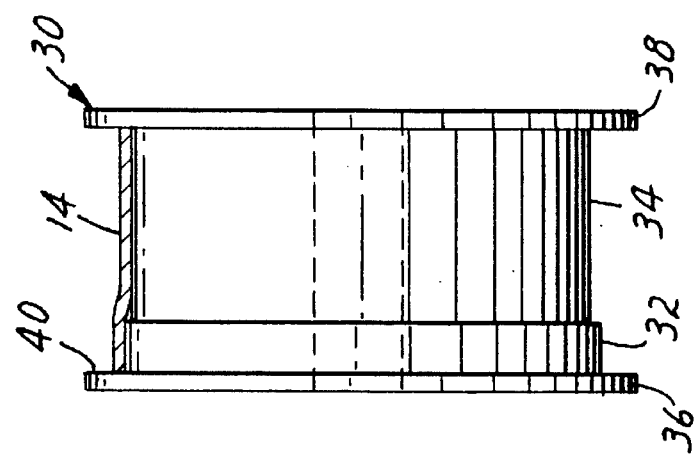
FIG. 2 is an elevational view of a stepped pre-wrap alignment roller.

FIG. 2 shows a pre-wrap guide roller 30 with a central portion which is divided into first and second cylindrical sections 32, 34 located between end flanges 36, 38. The first cylindrical section 32 has a larger diameter than the second cylindrical section 34. In operation, the tape 14 wraps around the roller 30 for an angular distance of approximately 90° as best shown in FIGS. 1 and 3. The radius of curvature of the portion of the tape 14 which wraps around the larger first cylindrical section 32 is slightly larger than the radius of curvature of the portion of the tape 14 wrapping around the smaller second cylindrical section 34. As a result, the wrapped portion of the tape 14 assumes a shape which tends to steer it toward the surface 40 of the flange 36, so that the surface 40 provides a precise locating reference surface for the tape strand 14 as it is wound on the roll 12.

The packwheel 26 is a freely turning solid wheel 42 with a resilient outer layer 44 and is rotated by friction between it and the tape roll 12. The wheel 42 is carried on a bearing 46 mounted on shaft 48. The wheel 42 can be aluminum and the resilient layer 44 can be polyurethane having a Durometer hardness of 35–55. The layer 44 can be 0.635 cm (0.25 in) thick. It is preferred that the packwheel 26 have the largest diameter which can fit into the available space. It is also preferred that angular distance A between the pre-wrap roller 30 and the packwheel 26 be about 15° to 25°, so that the strand 14 contacts the roll 12 about 10°–15° ahead of the point of contact between the packwheel 26 and the roll 12.

As shown in FIG. 3, the pre-wrap roller 30 and packwheel 26 are carried on a packarm 50. The packarm 50 is mounted on a slide mechanism 52, which is rigidly mounted to a fixed portion of the winding apparatus. It is important to maintain the axis of rotation of the pre-alignment guide roller 30 and the packwheel 26 parallel to the axis of rotation of the roll 12. Otherwise, the packwheel 26 can cause the tape strand 14 to run off roll 12.

The packwheel 26 is pressed against roll 12 by a force sufficient to expel a suitable amount of air from between the incoming strand 14 and the outer strand 22, without damaging the tape roll 12. Where the tape width is nominally 1.27 cm (0.5 in), a force of about 13.3–26.7 Newtons (3–6 lb) is satisfactory. Tape tension when winding under these conditions is set in the range of 0.56–1.39 Newtons (2–5 oz). The force on the packwheel 26 can be provided by an air cylinder 54, supplied with air under pressure.

Figure 4:
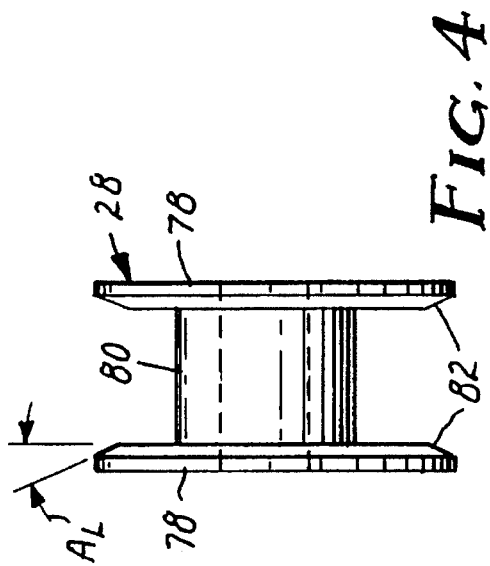
FIG. 4 is an elevational view of another embodiment of a final alignment roller.

FIG. 4 shows the freely rotating flanged guide roller 28 used as a final alignment guide. The guide roller 28 is rotated by friction between the flanges 78 and the outer edges of the roll 12. A preferred material for the final alignment roller 28 is polished stainless steel. The roller 28 includes a pair of disk-like flanges 78 coaxially attached to a central hub 80. The axial length of the central hub 80 (the distance between the flanges 78) is slightly greater than the width of the tape strand 14. In one embodiment, the tape strand width is 1.269 cm (0.4995 in), and the flange spacing is 1.273 cm (0.5010 in).

Surprisingly, although the strands of tape passing between the flanges 78 of the roller 28 can move laterally a distance of 0.004 cm (1.273 cm–1.269 cm) (1575 micro-inches), a distance which represents a deviation from the mean lateral tape location of 0.002 cm (0.004/2) (787.5 micro-inches), the actual surface roughnesses, as measured by a profilometer, is much less than this. The sides of the roll 12 are smoother than would be expected on the basis of the distances which the tape is free to move when passing the roller 28.

A suitable diameter for the hub 80 is 2.536 cm (1.00 in), and a suitable diameter for flanges 78 is 5.072 cm (2.00 in). Since the edges of the tape strand 14 are relatively fragile, there is some risk that during final alignment, the flanges 78 might damage the edges, especially if the tape strand is far out of alignment as it enters the final alignment channel between the flanges 78. To minimize this risk and improve the effectiveness of the final alignment process, tapered lead-in portions 82 are used on the flanges 78. A suitable angle $A_L$ for the lead-in portions 82 ranges from 15° to 30° with the lead-in portions 82 extending inwardly from outer periphery of the flanges 78 for about 0.33 cm (0.13 in).

Figure 5:
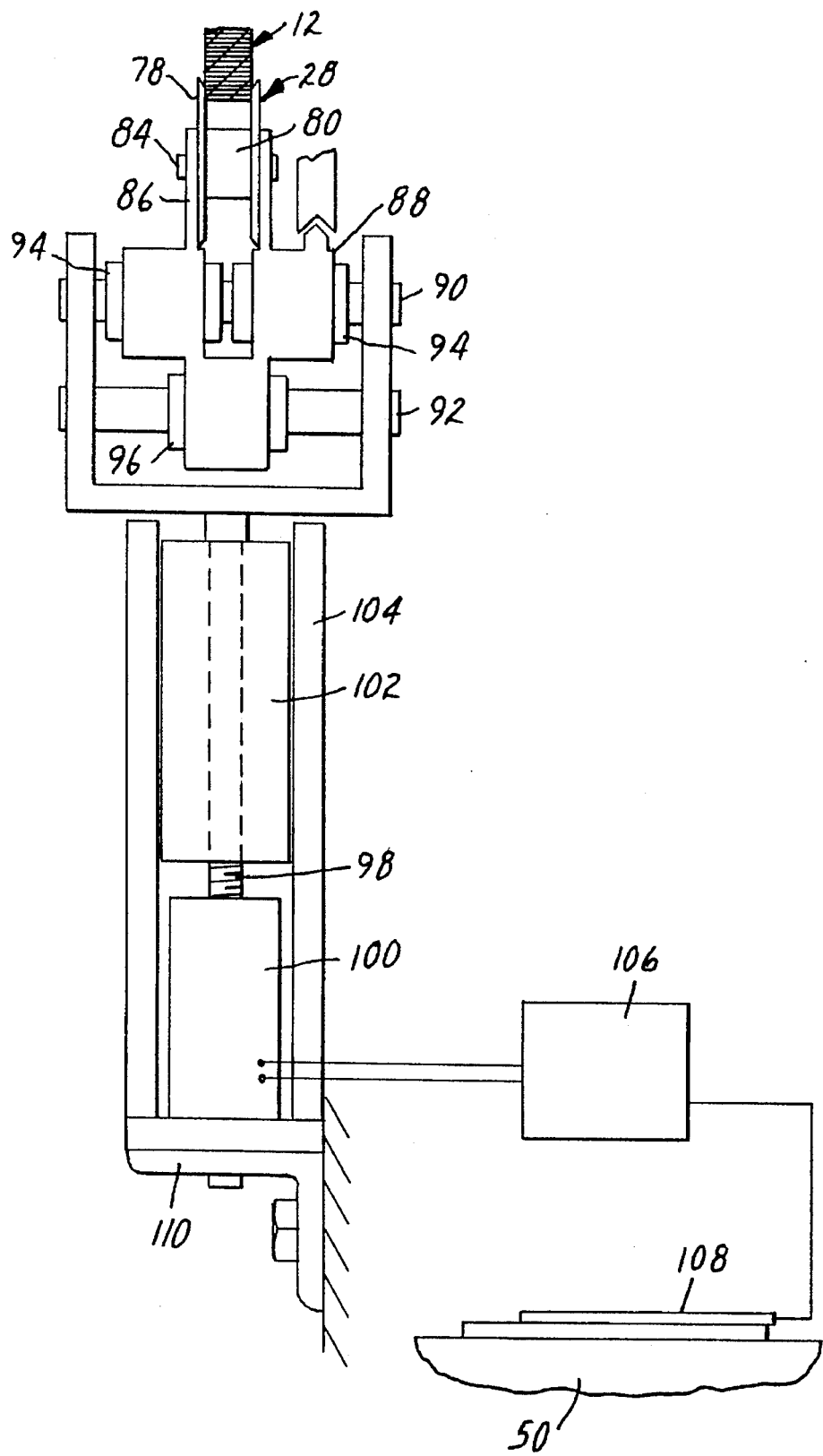
FIG. 5 is a top view of the final alignment roller and positioning apparatus.

As shown in FIG. 5, the final alignment guide roller 28 is carried on a shaft 84, which is held by brackets 86. The brackets 86 are fixed to a carriage 88, which is supported and can slide on precisely dimensioned and smoothly polished rods 90, 92. Since the final alignment roller 28 should be easily moved axially by even the slightest force, as might arise, for example, from slight wobble in rotating the tape roll 12, it is desirable that the mass of carriage 88 be as low as practical and the frictional resistance to movement of the carriage 88 along the rods 90, 92 be as low as possible.

Frictional resistance to movement of the carriage 88 can be reduced by, for example, using recirculating linear ball bushings 94, 96 which run on the rods 90, 92. Suitable ball bushings and rods can be obtained from Thomson Industries, Inc.

The alignment roller 28 is held radially sufficiently near the tape roll 12 to engage the flanges 78 with the edges of the outer strands of tape on the tape roll 12, but not so near as to allow the central hub 80 to contact the roll 12. Any contact between the hub 80 and the tape strand 22 would cause friction and resistance to lateral movement of the strand. This would interfere with alignment.

The preferred engagement distance of roller 28 with the tape roll 12 is about 0.33–0.48 cm (0.13–0.19 in) beyond the tapered edge. Radial positioning of the alignment roller 28 is determined by rotation of a screw 98, which is driven by a motor 100, and which moves a slide 102 along a track 104, in a radial direction to the tape roll 12. This maintains the desired roller to tape engagement as the diameter of the roll 12 grows during winding.

The motor 100 can be of several known types commonly used in positioning apparatus, such as a stepping motor. The motor 100 can be controlled by a motor controller 106, which is also commercially available. The controller 106 receives information from a linear transducer 108 regarding the position of the packarm 50, and hence the position of the outer strand 22. Based on the position of the outer strand 22, the controller 106 operates the motor 100 to position the alignment roller 28 at a suitable radial location relative to the roll 12.

The track 104 is held, by a bracket 110, to a fixed portion of the winding apparatus. However, since the carriage 88 can slide on rods 90, 92, with a minimum of resistance, the axial position of the guide roller 28 is substantially determined by the positions of previously wound strands of tape on the roll 12 which are engaged by the flanges 78.

Alternative devices, such as mechanical linkages, can control the engagement distance. In FIG. 6, the roller 28 is held in position relative to the roll 12 by a pivoting arm 56, which rotates around a pivot point 58 and which is urged upward by a force F, urging a roller 60 against a cam 62. As the packarm 50 moves outward, the cam 62 urges the roller 60 downward, moving the roller 60 outward from the roll 12 and maintaining a suitable value for the engagement distance.

An alternative system for urging the pivoting arm 56 upward would be to extend the arm 56 beyond the pivot 58, and use a weight to apply a downward force F' to an extended portion 64. This is shown in broken line in FIG. 6. Other systems for providing an upwardly urged pivoting function controlled by position of packarm 50 can be used.

Figure 7:
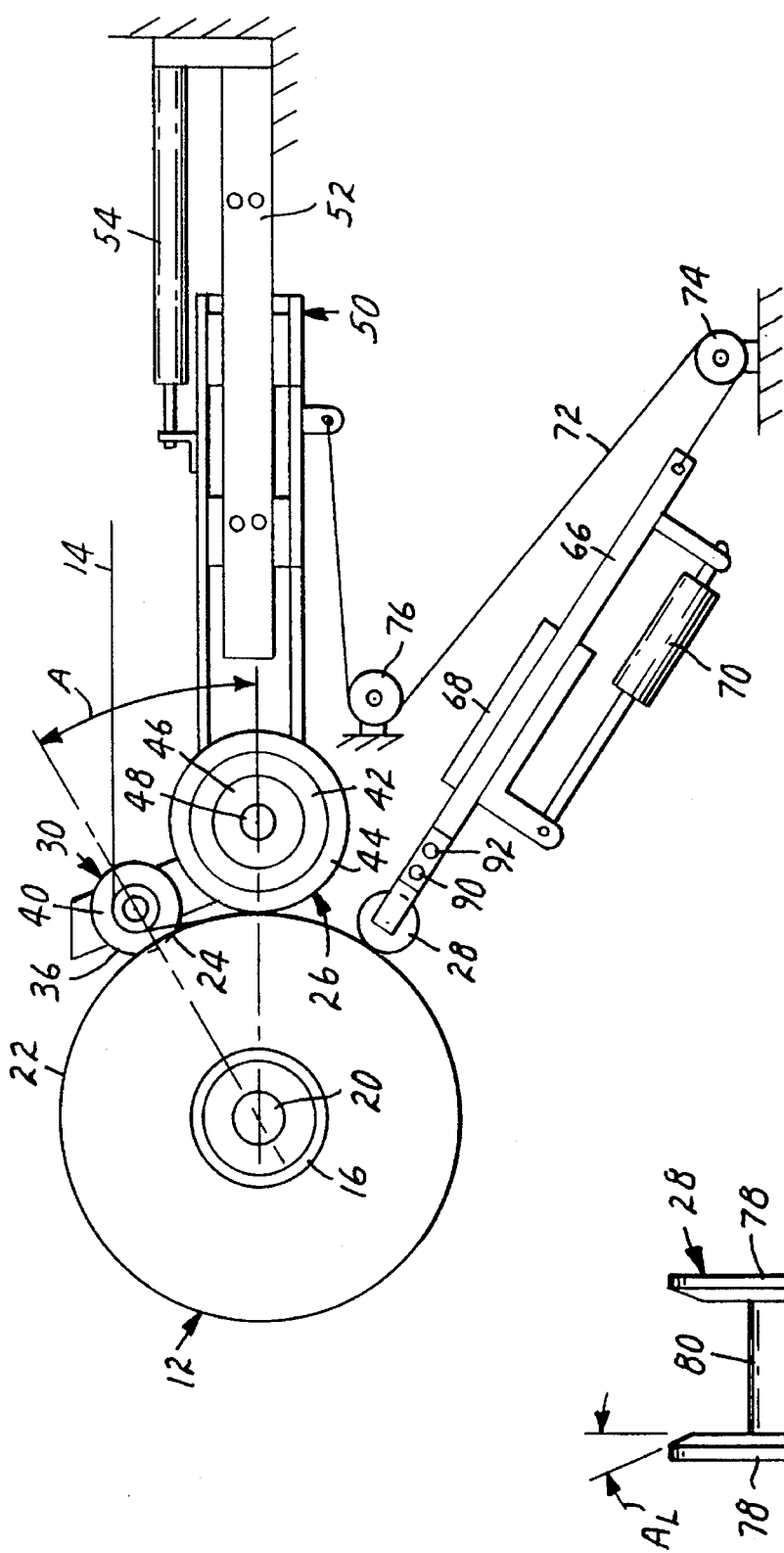
FIG. 7 is a side view of another embodiment for positioning a final alignment guide roller using a cable.

In another alternative embodiment, shown in FIG. 7, the roller 28 is positioned relative to the roll 12 by a sliding member 66 held in a track 68. The sliding member 66 is urged toward the roll 12 by an air cylinder 70, while being restrained from contacting the roll 12 by a cable 72. One end of the cable 72 is attached to the sliding member 66, and the other end to the packarm 50. By passing the cable 72 over pulleys 74, 76 the cable 72 pulls the sliding member 66 outward from the roll 12, against the urging of the air cylinder 70, when the packarm 50 moves outward from the roll 12. This maintains the roller 28 in a suitable position relative to the outer strand 22 of the roll 12. Alternatively, the air cylinder 70 could be replaced by a spring, and other cable arrangements for positioning the roller 28 relative to the packarm 50 can be used.

Figure 8:
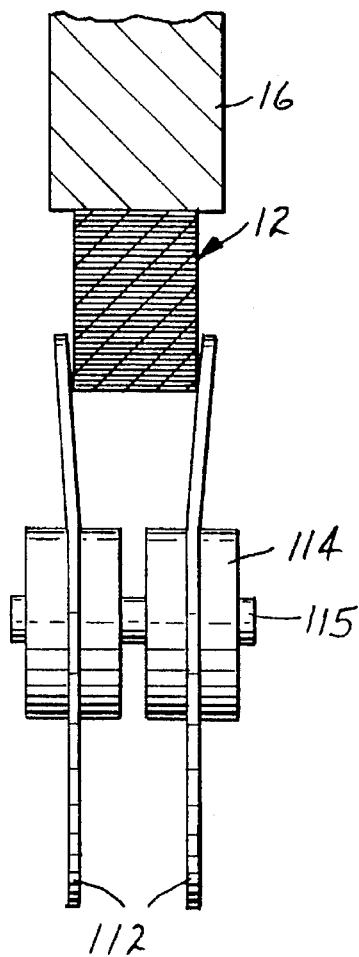
FIG. 8 is a top view of one embodiment of final alignment device, in which flexible disks provide final alignment.

In the alternative embodiment shown in FIG. 8, final alignment is performed by flexible disks 112, which are held by freely rotating hubs 114 mounted on bearings on the shaft 115. The flexibility of the disks 112 reduces the need for the carriage 88 to move. The diameter of the disks 112 can range from 5.1 to 7.6 cm (2.0 in to 3.0 in). Suitable disks having a diameter of 5.1 cm (2.0 in) have been made from a 0.79 mm (0.031 in) thick sheet of polytetrafluoroethylene (available from E.I. DuPont de Nemours and Company). Suitable disks have also been made from high density polyethylene having a thickness of 0.79–1.45 mm (0.031–0.057 in).

Figure 9:
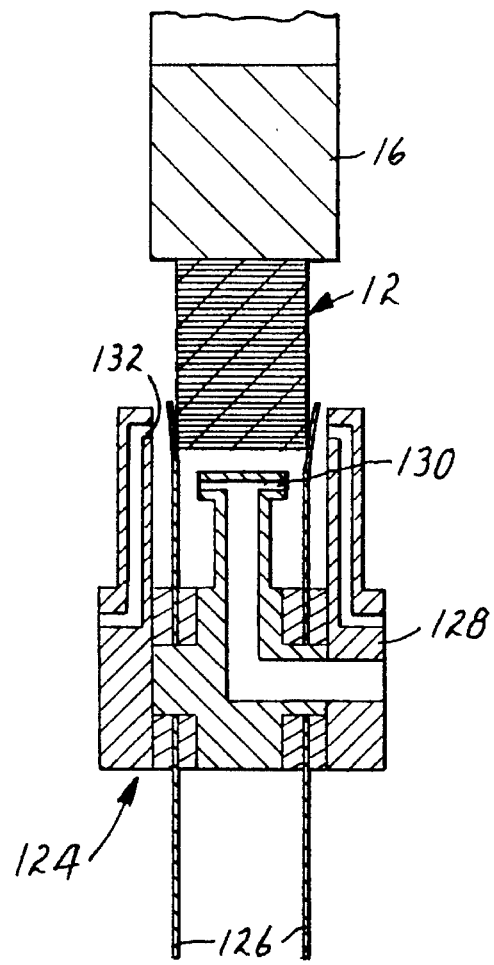
FIG. 9 is a top view of another embodiment of the final alignment device in which flexible disks provide final alignment.

In an alternative embodiment, fluid jets, such as air jets supplied from a compressor, change the spacing between the flexible alignment disks, as shown in the alignment assembly 124 of FIG. 9. The alignment disks 126 are held by a hub 128 using low friction bearings. During the initial stages of winding, the disks 126 are positioned on either side of the tape roll 12 and air jets are emitted from orifices 130. These air jets urge the disks 126 outwardly, away from the tape roll 12 to keep the disks from contacting the outer strands of tape on the roll as the alignment assembly 124 is brought into position adjacent the roll. After the disks 126 are located in contact with the sides of the tape roll 12, they are urged inwardly, toward the tape roll by air jets emitted from orifices 132. By using small orifices 132, the air jets impinge on small areas. This forms the disks 126 into shapes which define a convergent channel between the disks and reduces the risk of damaging tape strands during alignment. The air flow is switched from the orifices 130 to the orifices 132 by suitable valves.

Figure 10:
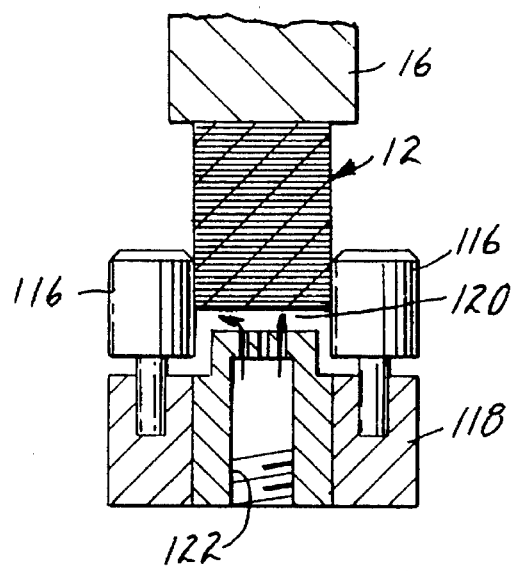
FIG. 10 is a top view of another embodiment of the final alignment device, in which rollers contact the edges of the strand to provide final alignment.

In the embodiment of FIG. 10, final alignment is performed by two small, freely rotating rollers 116, which are held by a bracket 118. The bracket 118 is held by a pivoting arm a selected distance from the tape roll 12 by a low friction cushion of pressurized air 120, which is injected through a nozzle 122. The pressurized air can be provided by a suitably regulated supply. Alternatively, the bracket 118 could be positioned relative to roll 12 by the positioning apparatus shown in FIG. 5. It has also been found useful to spring load the rollers 116 against the sides of the tape roll 12 to provide more precise alignment of tape strands.

To begin winding of the roll 12, the tape strand 14 is first positioned relative to the hub 16 by the pre-wrap roller 30, and is attached to hub 16 by a substance which acts as a temporary adhesive such as a small amount of moisture placed near the end of the strand 14, on the side facing the hub 16. Rotation of the hub 16 begins, and the tape strand 14 is wound onto the hub 16, to form the roll 12 which becomes a tape pancake. As winding progresses, the tape strand 14 is pre-positioned relative to the roll 12 by the pre-wrap roller 30, and is pressed against the previously wound strand 22 by the packwheel 26.

After the strand 14 passes the packwheel 26, it is supported on a very thin lubricating layer of air between it and the previously wound strand on roll 12. This air layer allows the flanges 78 to move the strand 14 into alignment with the previously wound strands. Because the alignment roller 28 can move axially, and the flanges 78 engage several previously wound strands, the flanges 78 can use these previously wound strands as a gauge to precisely align the strand 14 in a position determined by these previously wound strands.

As the roll 12 rotates and the entering strand 14 is wound onto the roll 12, it becomes the outer strand 22. As the newly created outer strand 22 is carried around the roll 12, air continues to flow out of the lubricating layer between it and the next strand in on the roll 12.

As the strand 22 completes a full rotation and again passes under the packwheel, still more air is expelled from the lubricating layer. As the strand (now the third strand in on the roll beneath two new strands) passes between the alignment flanges 78, it may receive another final alignment if there is sufficient air in the lubricating layer to allow further movement of the strand by the flanges 78.

At some point in the winding process, the lubricating layer between inner strands becomes sufficiently thin to allow the tape strands to contact each other, thereby locking them in place in an aligned position on the roll. As a result of the precise alignment of the strands on the roll 12, the sides of the roll 12 are very smooth, contributing to the quality and appearance of the finished pancake.

We claim:

1. A magnetic tape winding apparatus for winding a length of magnetic tape in concentric strands on a flangeless hub to form a pancake, the apparatus comprising:

means for mounting the hub on the apparatus;

means for rotating the mounting means and the hub while magnetic tape is wound on the hub to form a roll;

means for removing air from between strands of tape as the strands are wound onto previous strands on the hub, wherein the removing air means is separate from the rotating means; and means for laterally aligning the strands of tape as the strands are wound onto the hub comprising means for pre-aligning the strands located to contact the tape that is wrapped on the hub, wherein the pre-aligning means comprises a pre-wrap guide roller comprising a central portion and first and second end flanges, wherein the central portion comprises first and second cylindrical sections located between the first and second end flanges, wherein the first cylindrical section is adjacent the first flange and has a larger diameter than the second cylindrical section such that in operation, the tape wraps around the pre-wrap guide roller to steer the tape toward the first flange to provide a precise locating reference surface for the tape.

2. The apparatus of claim 1 wherein the laterally aligning means comprises means for post-aligning the strands and wherein the apparatus creates pancakes having sides with a surface roughness less than 100 micro-inches ($R_A$).

3. The apparatus of claim 2 wherein the post-aligning means comprises a final alignment guide roller and wherein the apparatus creates pancakes having sides with a surface roughness less than 30 micro-inches ($R_A$).

4. The apparatus of claim 3 wherein the final alignment guide roller comprises a central hub and a pair of disk-like flanges coaxially attached to the hub, wherein the axial length of the hub is greater than the width of the tape strand, wherein the actual measured surface roughness ($R_A$) is less than a potential lateral movement distance created by clearance between the flanges.

5. The apparatus of claim 4 wherein the final alignment guide roller flanges have tapered lead-in portions.

6. The apparatus of claim 3 wherein the post-aligning means comprises a pair of small, freely rotating rollers having axes perpendicular to an axis of the pancake.

7. The apparatus of claim 3 wherein the post-aligning means comprises a pair of spaced flexible disks.

8. The apparatus of claim 1 wherein the air removing means comprises a packwheel.

9. The apparatus of claim 8 wherein the packwheel comprises a freely turning solid wheel having a resilient outer layer, and wherein the wheel is mounted on a shaft at a location such that an entering tape strand contacts an outer tape strand 5°–20° ahead of the point of contact between the packwheel and the outer tape strand.

10. The apparatus of claim 9 further comprising an arm, wherein the pre-wrap roller and the packwheel are mounted on the arm to maintain an axis of rotation of both the pre-wrap roller and the packwheel parallel to an axis of rotation of the roll.

11. The apparatus of claim 10 further comprising means for maintaining the axis of rotation of the pre-wrap roller and the packwheel parallel to the axis of rotation of the roll.

12. A magnetic tape winding apparatus for winding a length of magnetic tape in concentric strands on a flangeless hub to form a pancake, the apparatus comprising:

means for mounting the hub on the apparatus;

means for rotating the mounting means and the hub while magnetic tape is wound on the hub to form a roll;

means for laterally aligning the strands of tape as the strands are wound onto the hub comprising means for post-aligning the strands comprising a final alignment guide roller, wherein the apparatus creates pancakes having sides with a surface roughness less than 30 micro-inches ($R_A$);

means for removing air from between strands of tape as the strands are wound onto previous strands on the hub, wherein the removing air means is separate from the rotating means;

means for permitting the final alignment guide roller to move laterally along with the pancake to compensate for any wobble of the pancake during winding without damaging the magnetic tape; and means for moving the final alignment guide roller radially away from the hub as the magnetic tape is wound on the hub to maintain a constant level of engagement and force on outermost strands of magnetic tape on the hub while accommodating an increasing pancake diameter.

13. The apparatus of claim 12 wherein the final alignment guide roller comprises a central hub and a pair of disk-like flanges coaxially attached to the central hub, wherein the tape strand has a width and the central hub has an axial length that is greater than the width of the tape strand and wherein the surface roughness is less than the difference between the central hub axial length and the tape strand width.

14. The apparatus of claim 12 wherein the final alignment guide roller comprises a hub and flanges and wherein the apparatus further comprises means for urging the final alignment guide roller toward the roll while restraining the final alignment guide roller hub from contacting the roll.

15. A magnetic tape winding apparatus for winding a length of magnetic tape in concentric strands on a flangeless hub to form a pancake, the apparatus comprising:

means for mounting the hub on the apparatus;

means for rotating the mounting means and the hub while magnetic tape is wound on the hub to form a roll;

means for laterally aligning the strands of tape as the strands are would onto the hub comprising means for pre-aligning the strands and means for post-aligning the strands comprising a final alignment guide roller;

means for removing air from between strands of tape as the strands are wound onto previous strands on the hub;

means for urging the final alignment guide roller toward the roll while restraining the final alignment guide roller hub from contacting the roll; and an arm, wherein the pre-aligning means and the air removing means are mounted on the arm, wherein the urging and restraining means comprises means for forcing the final alignment guide roller toward the roll, a movable member on which the final alignment guide roller is mounted, and a cable, wherein one end of the cable is attached to the movable member and another end to the arm, and wherein the cable pulls the movable member outward from the roll against the urging of the forcing means when the arm moves outward from the roll.

16. A magnetic tape winding apparatus for winding a length of magnetic tape in concentric strands on a flangeless hub to form a pancake, the apparatus comprising:

means for mounting the hub on the apparatus;

means for rotating the mounting means and the hub while magnetic tape is wound on the hub to form a roll;

means for laterally aligning the strands of tape as the strands are wound onto the hub comprising means for post-aligning the strands comprising a pair of spaced flexible disks;

means for removing air from between strands of tape as the strands are wound onto previous strands on the hub; and means for applying one of a closing force and an opening force on the disks, wherein the closing force pushes the disks toward each other and the opening force pushes the disks away from each other.

17. The apparatus of claim 16 wherein the applying means comprises fluid jets which impinge fluid on one major surface of at least one of the disks.

* * * * *